(No Model.)
F. A. HEAD & S. A. KERNS.
COTTON PLANTER.
No. 539,362. Patented May 14, 1895.
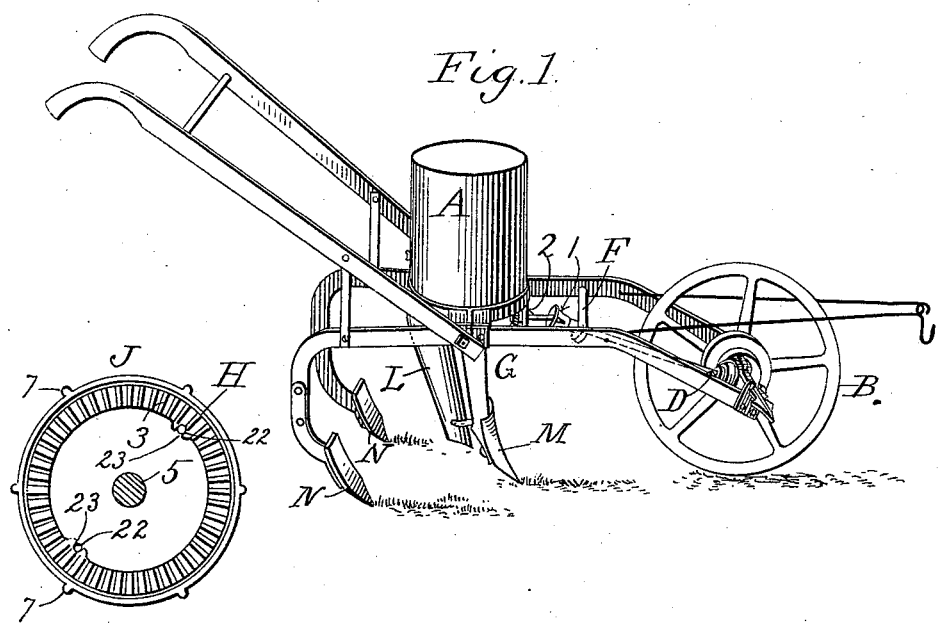
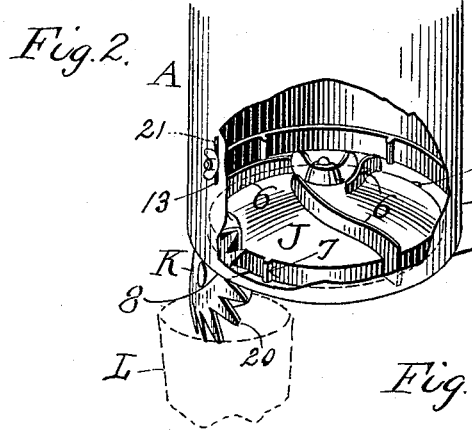
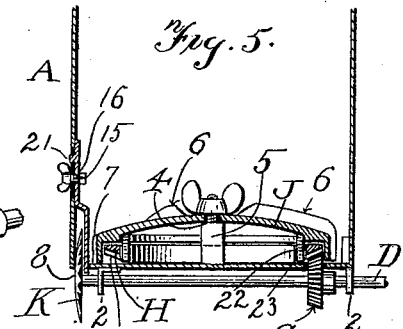
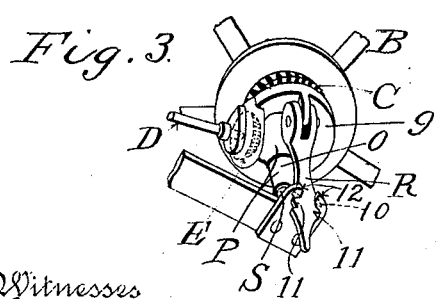
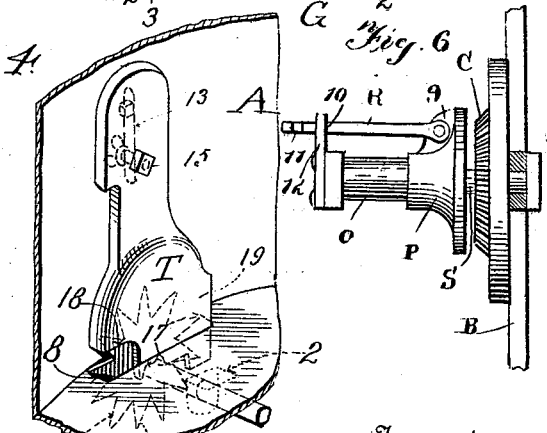
Witnesses
C. C. Burdine
C. B. Bull
Inventors
Frederick A. Head
Simon A. Kerns
by John G. Manahan
their Attorney

UNITED STATES PATENT OFFICE.

FREDERICK A. HEAD AND SIMON A. KERNS, OF ROCK ISLAND, ILLINOIS, ASSIGNORS TO THE ROCK ISLAND PLOW COMPANY, OF SAME PLACE.

COTTON-PLANTER.

SPECIFICATION forming part of Letters Patent No. 539,362, dated May 14, 1895.

Application filed January 24, 1895. Serial No. 536,075. (No model.)

*To all whom it may concern:*

Be it known that we, FREDERICK A. HEAD and SIMON A. KERNS, citizens of the United States, residing at Rock Island, in the county of Rock Island and State of Illinois, have invented certain new and useful Improvements in Cotton-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention pertains to improvements in cotton seeders and consists, first, of certain novel devices for forcing such seed from the hopper into the seed tube in a constant and uniform manner, and, second, of simple and effective means for connecting and disconnecting the seed devices and the driving mechanism.

It is well known that cotton seed in the mass, by reason of the cotton clinging thereto, is so adhesive and so disposed to bunch, that it can be separated only by positive action thereon; neither does such seed move by gravity with the readiness of other seed, as its specific gravity is comparatively small. To overcome these difficulties, we provide in the seed hopper a convex revolving base under the cotton seed, having a less diameter than said hopper, and on the upper surface of said base, we form deflecting wings, which, with such convexity, in the rotation of the base, continuously force the seed to and over the periphery of said base. On the periphery of said plate are formed short radial spurs which engage the seed, tear it apart, and move it around to the seed exit. At the latter locality, a star wheel is rotated in a vertical plane, beneath the seed hopper in such relation to the seed exit as to project its radial spokes into the seed collected at said exit by said rotating base, and disintegrate the seed mass or masses, and cast the seed in distributive quantities, into the open upper end of the seed spout from whence the seed falls to the earth by its own gravity. An adjustable gate over the seed exit of the hopper is adapted to vary the size of said exit, and thereby regulate the discharge of the seed, as may be desired.

We attain the above purposes by the use of the mechanism illustrated in the accompanying drawings, in which—

Figure 1 is a perspective of a machine embodying our invention. Fig. 2 represents details of the seeding mechanism. In one view a portion of the seed-hopper is removed to disclose its interior. Fig. 3 represents details of the mechanism for connecting and disconnecting the driving-wheel and seeding mechanism. Fig. 4 is a detail of said seed-exit and the adjustable gate used in connection therewith. Fig. 5 is a vertical sectional view of the bottom of the seed-hopper, and Fig. 6 is a view substantially at a right angle to Fig. 3.

Similar letters and numerals refer to similar parts throughout the several views.

A is the seed hopper, suitably and about centrally seated on the frame of the machine.

B is the front ground wheel, which performs the double function of controlling the depth of the planting, and operating as a traction wheel to drive the seed mechanism.

C is a beveled gear, either integral with, or rigidly affixed to one side of the wheel B. A rotating shaft D, provided with a pinion E, extends from the gear C on the wheel B backward to and under the seed hopper A. Said shaft is preferably provided with a loose bearing on the cross tie F of the frame of the machine, and is also provided at 1 with the usual knuckle to permit said shaft to make the necessary deflections to pass horizontally, and substantially longitudinally of the machine, under the seed hopper A, although said intermediate bearing of shaft D at F is not indispensable. The pinion E is adapted to be engaged by the gear C, and there is thus imparted to the shaft D the necessary rotation. The shaft D. is further held loosely within the bearings 2. 2. attached to the lower side of the base of the hopper A. and loosely rotates in said bearings.

The pinion G. is rigidly seated on the shaft D. under and slightly within the front edge of the hopper A. and projects upwardly through the base of the latter, sufficiently to engage and rotate a gear ring H. suitably pivoted through the medium of base J, on the bottom of the hopper A. and provided on its lower surface with gear 3. to be engaged by said pinion G.

On the gear ring H. is seated the revolving base J., having a central opening 4. by which it is loosely collared upon the central fixed post 5. projected into the seed hopper from beneath, and through the opening 4. Bosses 22 on lower surface of base J, drop into recesses 23, in inner wall of gear H. On the upper surface of the base J., are formed equidistant deflecting wings 6. 6. extending, as shown, from near the center of said base to its periphery. The wings 6. are projected obliquely across the line of rotation of said base, so that the pressure of said wings against the super-imposed seed is diagonal, and has its initiate near the center of said base, thereby tending to gradually move the said seed toward the periphery of said plate. A sufficient convexity of the upper surface of the base J. assists in the aforesaid movement of the seed toward the edge thereof.

The diameter of the rotating base J. is slightly less than that of the inside of the hopper A. leaving a narrow annular space outside the periphery of said base, to receive a limited quantity of the seed falling over the edge of the latter. Radial spurs 7, formed at certain intervals on the periphery of the rotating base J, project into the aforesaid annular space and carry the seed therein gradually and successively around to the seed exit 8.

On the rear end of the shaft D there is rigidly seated the star wheel K, in position to project upward sufficiently within the exit 8 to engage the seed in the annular space aforesaid, and outside of the radial spurs 7, where the arms of said wheel, rotating in the direction opposite to that of said spurs 7, successively engage the desired quantity of the seed collected in said space, and cast them into the seed spout L, suitably suspended below said seed exit.

A shovel M, suitably affixed to the frame of the machine and projecting into the earth in front of the seed spout L, opens a furrow for the reception of the seed passing downwardly through said spout. Rear shovels N N, seated, respectively, slightly at one side of the path of shovel M, serve to cover said seed, or the same may be covered by a roller, or other suitable means.

On the long hub of the wheel B, there is preferably sleeved a bracket P, which carries the front end of the shaft D, and necessarily the pinion E, thereon. The sleeve P is adapted to be moved on hub O to or from the gear C, sufficiently to engage or disengage the pinion E and the gear C, and to thus suspend, when desired, the rotation of the shaft D and the operation of the seeding mechanism.

The bracket P may be sleeved on the spindle S, upon which the wheel B rotates, by restricting the length of the hub of said wheel.

The shaft D is seated at F sufficiently loose to permit of this lateral oscillation. The bracket P is reciprocated on the hub O, and held at the extremes of its movement by the following mechanism:—The inner end of the bracket P is formed into an annular cap 9, adapted to cover the gear C and exclude the dirt therefrom, when the said bracket P is at the limit of its inward movement. A short transverse arm R is pivotally connected at its inner end to the outer face of the cap 9, and is provided laterally at its outer end with inner notches 10 10, and outer notches 11, 11. On the frame of the machine at this point are formed upwardly projecting studs 12, 12, with an interval between them of sufficient width to permit the arm R to be forced downward between said studs 12 at the notches 10 or 11. Therefore, when the notches 11 are forced down between the studs 12, the pinion E is held in engagement with the gear C, and the seed mechanism is driven by the wheel B, and when the inner notches 10 of arm R are forced down between the studs 12 the pinion is held out of engagement with the gear C, and the operation of the seed mechanism is therefore suspended. The advantage of this method of holding the machine in and out of gear is, that it is simple, cheap, and reliable.

By the substitution of suitable seed plates and a cut off plate for the revolving base J, the machine can be readily converted into a grain seeder. The convexity of the upper surface of the base J is of great importance.

The discharge of the grain from the hopper A is regulated as follows:—A vertical slot 13 is formed in the rear wall of the hopper A above the segmental seed exit 8 in the base of hopper A. A vertically movable gate T is adjustably suspended on the inside of hopper A over said exit 8, by means of a square bolt 15, provided with a nut, and projected through a square hole 16 in the upper portion of said gate, and through said slot 13. A semi-circular recess 17 is formed in the bottom of gate T to bestride the shaft D of wheel K, which permits said gate to be lowered sufficiently to close all of exit 8, except so much of said exit as is opposite the opening 18 in the lower end of gate T. A segmental recess 19 is formed in the lower portion of gate T on the side thereof next the side of the hopper, and the arms 20 of wheel K, in the upper portion of their orbital movement, sweep through said recess 19. The opening 18 in gate T is at the end of said upper sweep of said arms 20, and, as the seed is forced through said opening 18 by the peripheral spurs 7 on rotating base J, arms 20 catch the seed, and cast it down into the seed duct. By moving bolt 15 up or down in slot 13, the size of opening 18 may be graduated to permit the egress of variable quantities of seed.

A short stud, or boss, 21 is formed on the outer side of the shank of gate T, above hole 16, and projected into slot 13, assists the bolt 15 in holding said gate in proper position.

What we claim as our invention, and de- sire to secure by Letters Patent of the United States, is—

1. The combination of a seed hopper A., rotating plate J. pivoted in the bottom of said hopper and provided with radial wings 6. and peripheral spurs 7. and with a gear H. shaft D., provided with pinion G. adapted to engage and rotate said base, a seed engaging wheel K. seated on the rear end of said shaft D. and adapted to rotate against the rotation of the plate J. and engage and discharge the seed carried by the latter, and suitable means for rotating the shaft D. substantially as shown and for the purpose described.

2. In a cotton planter, the combination of the hopper A., the rotating base J, pivotally seated in the bottom of said hopper and provided with the seed deflecting wings 6. and the peripheral spurs 7., means substantially as shown for rotating said base, and a rotating star wheel K. projected slightly within the base of the hopper A. and adapted to uniformly engage and carry the seed therefrom, substantially as shown and for the purpose described.

In testimony whereof we affix our signatures in presence of two witnesses.

FREDERICK A. HEAD.
SIMON A. KERNS.

Witnesses:
GEO. H. SHELDON,
J. F. FRANCIS.